United States Patent [19]
Frank et al.

[11] Patent Number: 4,834,679
[45] Date of Patent: May 30, 1989

[54] SWITCH AND TERMINAL ASSEMBLY

[75] Inventors: James P. Frank, Rock Falls, Ill.; James J. King, Holland, Mich.

[73] Assignee: General Electric Company, Fort Wayne, Ind.

[21] Appl. No.: 156,581

[22] Filed: Feb. 16, 1988

Related U.S. Application Data

[62] Division of Ser. No. 849,915, Apr. 9, 1986, Pat. No. 4,757,604, Division of Ser. No. 496,524, May 20, 1983, Pat. No. 4,594,773.

[51] Int. Cl.$^4$ .............................................. H01R 9/24
[52] U.S. Cl. ...................................... 439/709; 439/545
[58] Field of Search ................... 29/596, 622, 569.5, 29/505, 520; 310/68 E, 68 C, 68 R, 71, 89, 91; 200/80 R, 293, 296, 284; 439/544–548, 57, 907, 709; 248/27.1, 27.3; 403/254

[56] References Cited

U.S. PATENT DOCUMENTS

| | | | |
|---|---|---|---|
| 3,060,401 | 10/1962 | Fraser | 439/545 |
| 3,066,367 | 12/1962 | Garman | 439/56 |
| 3,209,093 | 9/1965 | Simpson | 200/80 |
| 3,244,832 | 4/1966 | Schaefer | 200/80 |
| 3,447,016 | 5/1969 | Rycroft | 439/57 |
| 3,601,762 | 8/1971 | Eshelman | 339/64 |
| 4,054,767 | 10/1977 | Anderson et al. | 200/293 |
| 4,095,073 | 6/1978 | Frank | 200/293 |
| 4,125,313 | 11/1978 | Sipp et al. | 339/176 |
| 4,240,001 | 12/1980 | Hildebrandt et al. | 200/80 R |
| 4,270,035 | 5/1981 | Richter, Sr. | 200/294 |
| 4,296,366 | 10/1981 | Hildebrandt et al. | 200/80 R |
| 4,340,793 | 7/1982 | Kirchoff | 200/284 |
| 4,426,770 | 1/1984 | Frank | 200/293 |

FOREIGN PATENT DOCUMENTS

597054  1/1948  United Kingdom .................. 310/89

Primary Examiner—Neil Abrams
Attorney, Agent, or Firm—Ralph E. Krisher, Jr.

[57] ABSTRACT

A switch and terminal assembly has a casing with a plurality of walls defining a switch means accommodating chamber within the casing. A plurality of terminals are associated with the casing along one of the wall means, and at least some terminals have a pair of electrical connector sections arranged in row formation, respectively. One of the electrical connector sections extends only beyond the one wall, and the other of the electrical connector sections extends beyond both the one wall and another of the walls adjacent the one wall, respectively. A dynamoelectric machine is also disclosed.

17 Claims, 8 Drawing Sheets

SWITCH AND TERMINAL ASSEMBLY

CROSS-REFERENCE TO RELATED APPLICATIONS

This application is a division of the commonly assigned parent application Ser. No. 849,915 filed Apr. 9, 1986 (now U.S. Pat. No. 4,757,604 issued July 9, 1988) which in turn was a division of grandparent application Ser. No. 496,524 filed May 20, 1983 (now U.S. Pat. No. 4,594,773 issued July 17, 1986), and such parent and grandparent applications are each incorporated herein by reference. Further, the application is related to the commonly assigned Robert W. White application Ser. No. 402,320 filed July 27, 1982 entitled "Dynamoelectric Machine" (now U.S. Pat. No. 4,473,764 issued Sept. 25, 1984) and also the commonly assigned James L. King application Ser. No. 496,552 filed May 20, 1983 (now abandoned), the aforementioned grandparent application entitled "Method Of Assembling A Dynamoelectric Machine", and each of these aforementioned related applications is incorporated by reference herein.

FIELD OF THE INVENTION

This invention relates in general to electrical apparatus and in particular to a switch and terminal assembly for a dynamoelectric machine.

BACKGROUND OF THE INVENTION

In the past, various different types of switching arrangements have been associated with dynamoelectric machines, such as an electric motor, for controlling at least the winding circuitry of such motors. In some instances, auxiliary circuits were connected through the aforementioned past switching arrangements and also controlled thereby. Some of these past switching arrangements are illustrated in the following listed patents: U.S. Pat. No. 3,313,905 issued to W. S. Zagorski; U.S. Pat. No. 3,381,197 issued to J. L. Waters et al.; U.S. Pat. No. 4,095,073 issued to J. P. Frank; and U.S. Pat. No. 4,054,767 issued to W. K. Anderson et al. All of the switch and terminal assemblies in the past switching arrangements in the above listed patents were mounted by at least one screw to an exterior face of one of the end frames of an electric motor, and the above listed U.S. Pat. Nos. 4,054,767 and 4,095,073 each illustrates a grounding connection scheme for the electric motor utilizing both a part of the switch and terminal assembly and the screw mounting it to the exterior face of the end frame of the electric motor. Further, the switch means of the switch and terminal assemblies in the above listed patents were operated by a lever arrangement pivoted on a part of the end frame of the electric motor, and such lever arrangement was engaged with force transmitting face on a push collar of a centrifugal mechanism so as to be pivotally actuated thereby when the electric motor attained a preselected speed.

Other types of past switching arrangements for controlling the winding circuitry of an electric motor were mounted internally thereof on terminal boards or the like, as shown in U.S. Pat. No. 2,305,093 issued to J. Leflar et al. and in U.S. Pat. No. 3,157,762 issued to R. E. Seely. Still other types of such past switching arrangements utilized switch and terminal assemblies which were totally enclosed and mounted interiorly of the electric motor, as illustrated in U.S. Pat. No. 2,603,732 issued to M. B. Hinman, U.S. Pat. No. 3,209,093 issued to W. F. Simpson, and U.S. Pat. No. 4,240,001 issued to E. F. Hildebrandt et al.

In at least some of the past switching arrangements, means were provided to effect operation of the switch in the switch and terminal assembly directly from a peripheral or outer radial surface on the push collar of the centrifugal mechanism generally as the electric motor attained a preselected speed; however, at least one of the disadvantageous or undesirable features of this type of switching arrangement is believed to be that the eccentricity of the push collar might adversely affect the operation of the switch of the switch and terminal assembly.

OBJECTS OF THE INVENTION

Among the several objects of the present invention may be noted the provision of an improved switch and terminal assembly which overcomes at least some of the disadvantageous or undesirable features discussed hereinabove, as well as others, with respect to the prior art; the provision of such improved switch and terminal assembly adapted for mounting arrangement with an end frame of a dynamoelectric machine to not only enhance mounting stability but also compensate for warpage which may occur in such end frame; the provision of such improved switch and terminal assembly having deformable sections on a casing for the switch and terminal assembly adapted for deformation to achieve a stable releasable gripping engagement of the switch and terminal assembly with the end frame of the dynamoelectric machine upon the mounting arrangement thereof; the provision of such improved switch and terminal assembly having a plurality of terminals associated with one wall of the casing with at least some terminals having a pair of electrical connector sections, one of the electrical connector sections extending in row formation with each other beyond the one wall means and the other of the electrical connector sections extending in row formation with each other beyond both the one wall and another wall of the casing adjacent the one wall; the provision of such improved switch and terminal assembly in which another of the terminals is associated with a means adapted for ground connection; the provision of such improved switch and terminal assembly wherein the another one terminal has only one of the one and other electrical connector sections; the provision of such improved switch and terminal assembly wherein some of the terminals include switch means supporting sections disposed in a switch means accommodating chamber within the casing; the provision of such improved switch and terminal assembly having a set of hanger brackets extending from a third wall means of the casing with a set of shearable sections on the hanger brackets extending toward the third wall means; and the provision of such improved dynamoelectric machine, switch and terminal assembly and method in which the components thereof are of a simple design, easily assembly and economically manufactured. These as well as other objects and advantageous features of the present invention will be in part apparent and in part pointed out hereinafter.

In general, a switch and terminal assembly in one form of the invention has a casing with a plurality of wall means defining switch accommodating chamber means within the casing. A plurality of terminals are associated with the casing along one of the wall means thereof, and at least some of the terminals include a pair of electrical connector sections arranged generally in planar and angular relation and extending generally in row formation with each other exteriorly of the casing. One of the electrical connector sections of the at least some terminals extending in the row formation thereof only beyond the one wall means of the casing and the other of the electrical connector sections of the at least some terminals extending in the row formation thereof beyond both the one wall means and another of the wall means of said casing adjacent the one wall means thereof, respectively.

Further in general, a switch and terminal assembly in one form of the invention has a casing with a plurality of wall means defining a switch means accommodating chamber within the casing, and a plurality of terminals extend along one of the wall means of the casing. At least one electrical connector section is provided on each of the terminals exteriorly of the casing some of the terminals being switch terminals supporting switch means within the switch means accommodating chamber. A set of hanger brackets integral with the casing respectively include a set of flanges extending beyond the casing in a direction generally away from the one wall means thereof, a set of end portions on the flanges extending therefrom in a direction generally in planar relation with the one wall means, and a set of shearable sections on the end portions extending therefrom in a direction generally toward the one wall means, respectively.

BRIEF DESCRIPTION OF THE DRAWINGS

Corresponding reference characters indicate corresponding parts throughout the several views of the drawings.

The exemplifications set out herein illustrate the preferred embodiments of the invention in one form thereof, and such exemplifications are not to be construed as limiting in any manner the scope of the invention or the scope of the disclosure thereof.

DETAILED DESCRIPTION OF THE PREFERRED EMBODIMENTS

Figure 8:
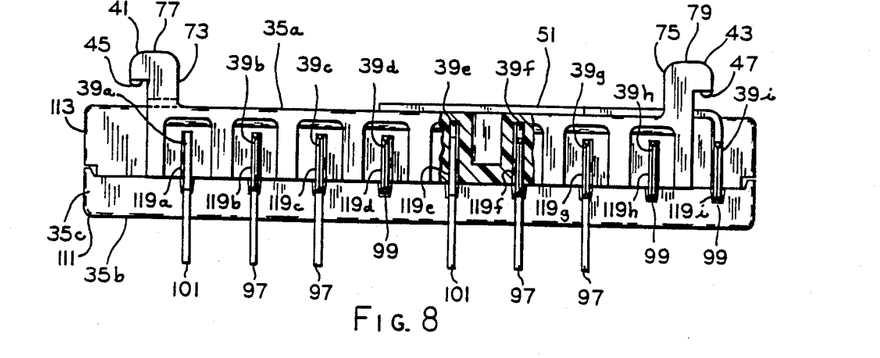
FIG. 8 is a top elevational view of the switch and terminal assembly of FIG. 2.
Figure 9:
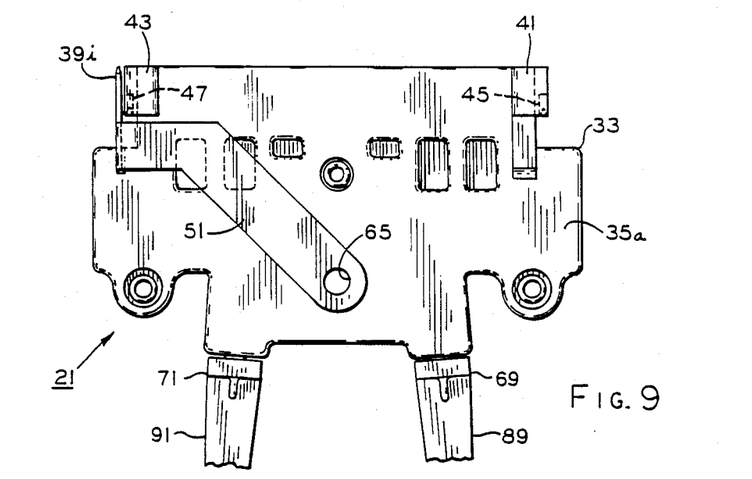
FIG. 9 is a rear elevational view of the switch and terminal assembly of FIG. 2.
Figure 10:
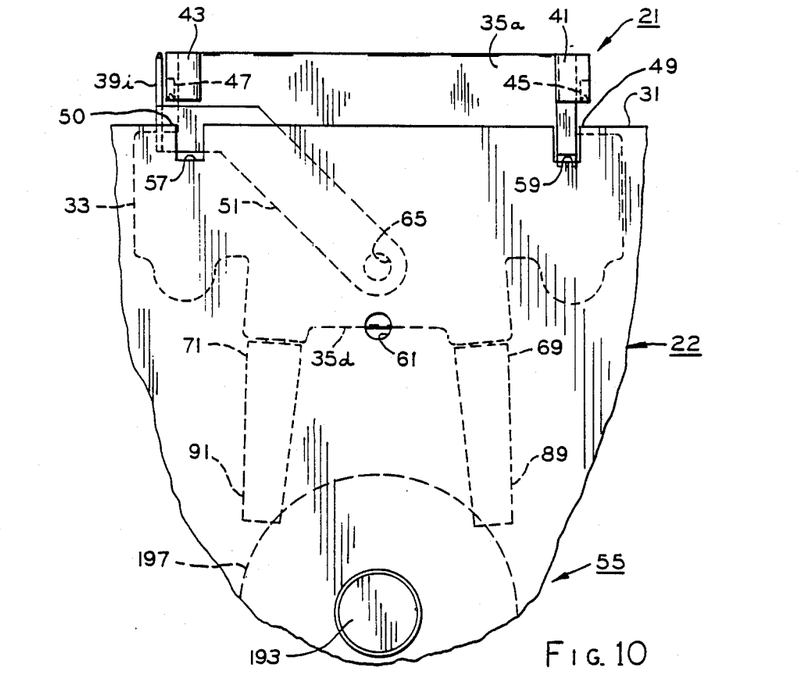
FIG. 10 is a partial right end elevational view of the end frame for the dynamoelectric machine of FIG. 1 showing the switch and terminal assembly disassociated therefrom and illustraing principles which may be practiced in a method of assembling a switch and terminal assembly to the end frame of the dynamoelectric machine.
Figures 11, 12, 13, 14:
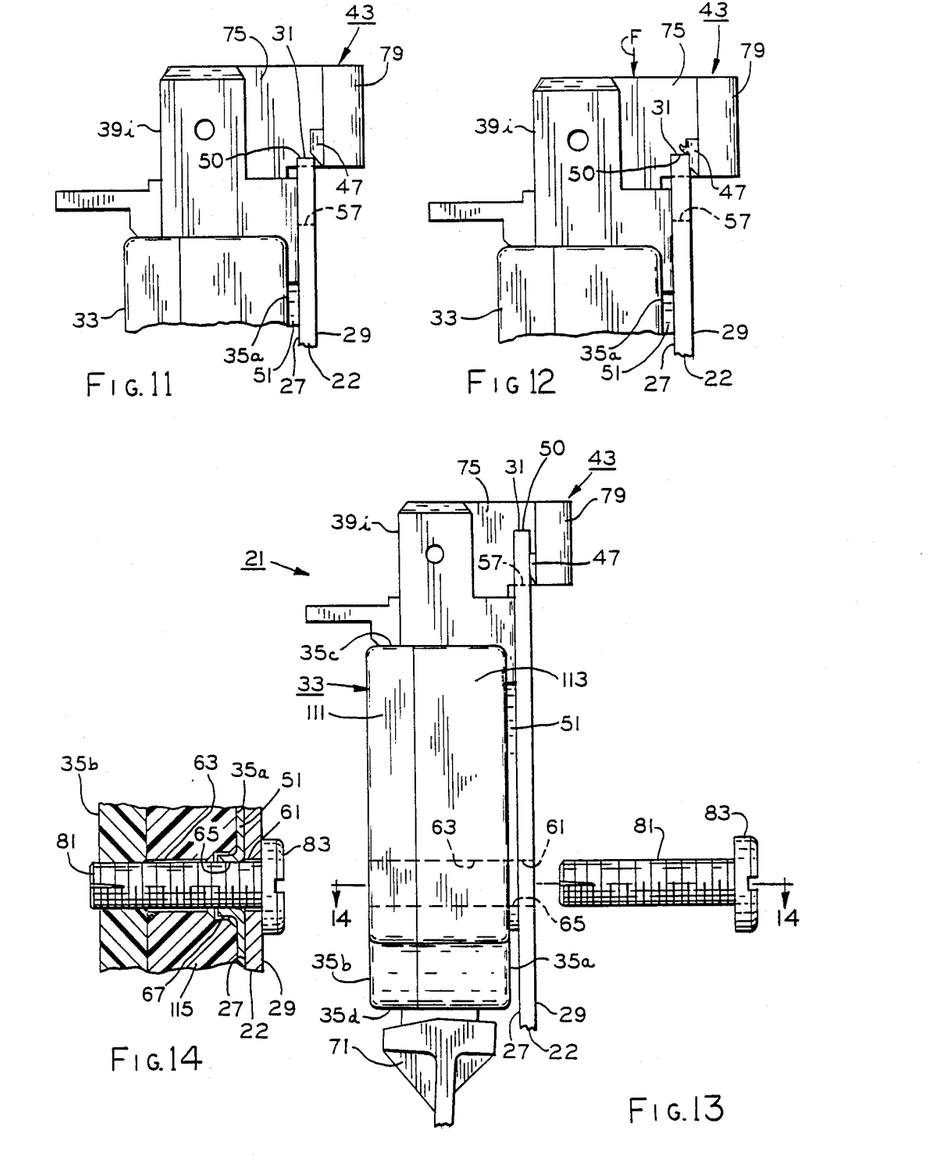
FIGS. 11, 12 and 13 are enlarged partial views taken from FIG. 10 further illustrating the method of assembling the switch and terminal assembly to the end frame for the dynamoelectric machine, respectively.
FIG. 14 is a sectional view taken along line 14—14 of FIG. 13.

With reference to the drawings in general, there is illustrated a method of assembling a switch and terminal assembly 21 to an end frame 22 for a dynamoelectric machine 23 (FIGS. 1 and 10-14). End frame 22 is formed of an electrical conductive material, such as sheet steel or the like for instance, and the end frame has a pair of opposite faces 27, 29 with a peripheral edge 31 intersecting therebetween (FIGS. 1 and 11-13). Switch and terminal assembly 21 has a casing 33 with a plurality of walls or wall means, indicated generally at 35, defining chamber means 37 within the casing (FIGS. 2-7). A plurality of terminals 39a-39i are associated with casing 33 with some of the terminals, such as for instance terminals 39a, 39d, 39e, 39f, 39h, being switch terminals supporting switch means or switch elements (as discussed in greater detail hereinafter) within chamber means 37, respectively (FIGS. 2-6 and 8). A set of means, such as mounting or hanger brackers 41, 43 or the like for instance, on casing 33 extend beyond one of the walls 35a thereof for mounting the casing on end frame 22 of dynamoelectric machine 23, and mounting means or brackets 41, 43 have a set of deformable sections or portions 45, 47, respectively (FIG. 10). Terminal 39i comprises a ground terminal having a ground strap 51 extending therefrom into overlying or abutting relation with casing wall 35a (FIGS. 9-14). In practicing this method, wall 35a of casing 33 is associated at least adjacent opposite face 27 of end frame 22, and ground strap 51 is interposed between wall 35a of the casing and opposite face 27 of the end frame (FIGS. 1 and 11-14). Brackets 41, 43 on casing 33 are disposed at least in part across peripheral edge 31 of end frame 22, and deformable sections 45, 47 on the brackets are engaged or abutted with the peripheral edge at least generally adjacent the intersection thereof with opposite face 29 of the end frame, respectively (FIG. 9). While peripheral edge 31 defines a set of surfaces or surface mens 49, 50 for engagement with deformable sections 45, 47 of casing brackets 41, 43, it is contemplated that such surfaces 49, 50 may be arranged on the end frame between opposite faces 27, 29 thereof other than on the peripheral edge of the end frame within the scope of the invention so as to meet at least some of the objects thereof. Brackets 41, 43 are moved toward seated or assembly positions thereof on end frame 22, and deformable sections 45, 47 are at least deformed against surface means 49, 50 of the end frame at least generally as the brackets are moved toward the seated or assembly positions thereof, respectively (FIG. 10). The at least deformed deformable sections 45, 47 on brackets 41, 43 are then passed past surface means 49, 50 of end frame 22 into releasable gripping engagement with opposite face 29 of the end frame with wall 35a of casing 33 arranged at least adjacent opposite face 27 of the end frame, and the brackets are disposed in the assembly positions thereof on the end frame thereby to at least assist in retaining ground strap 51 interposed between wall 35a of casing 33 and opposite face 27 of the end frame, respectively (FIG. 13).

Figure 1:
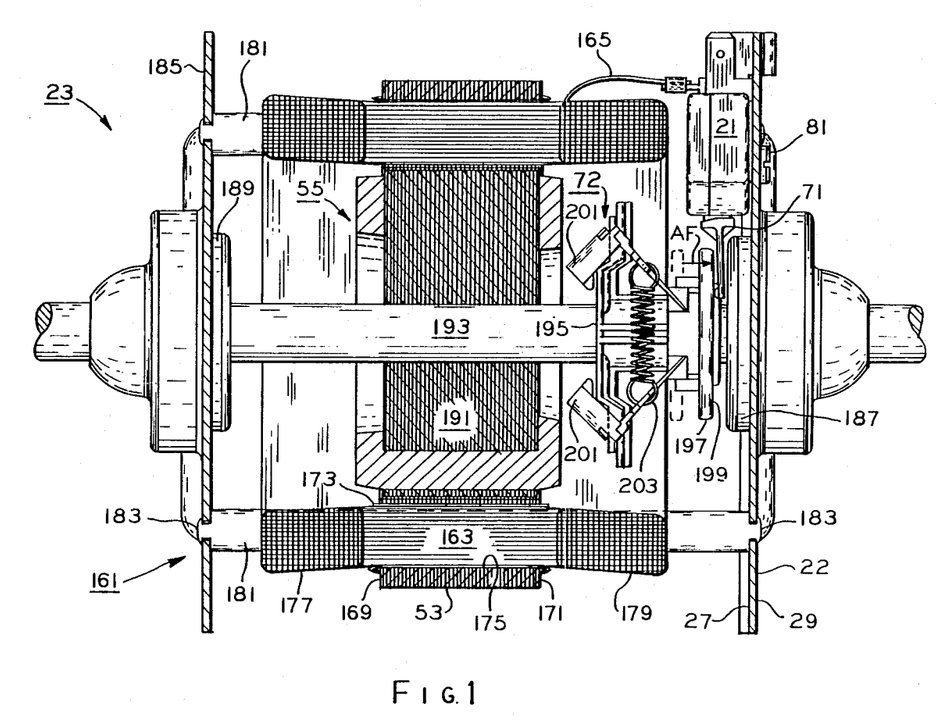
FIG. 1 is a partial sectional view illustrating a dynamoelectric machine with a switch and terminal assembly in one form of the invention mounted to an end frame of the dynamoelectric machine.

More particularly and with specific reference to FIGS. 1 and 10, dynamoelectic machine 23 has a stator or core 53 which is arranged in spaced apart relation with end frame 22, and a rotatable assembly 55 of the dynamoelectric machine extends at least in part through the core and the end frame. As best seen in FIG. 10, a pair of slots or grooves 57, 59 are provided in end frame 22 intersecting with opposite faces 27, 29 and peripheral edge 31 thereof, respectively, and an opening or aperture 61 extends through the end frame intersecting with the opposite faces thereof and being spaced from the peripheral edge so as to be arranged generally between the slots.

Figure 3:
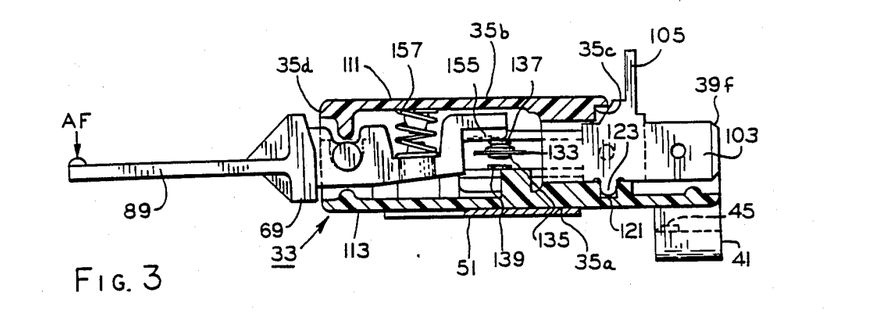
FIGS. 3, 4 and 5 are sectional views taken along lines 3—3, 4—4 and 5—5 in FIG. 2, respectively.
Figures 4, 6, 7:
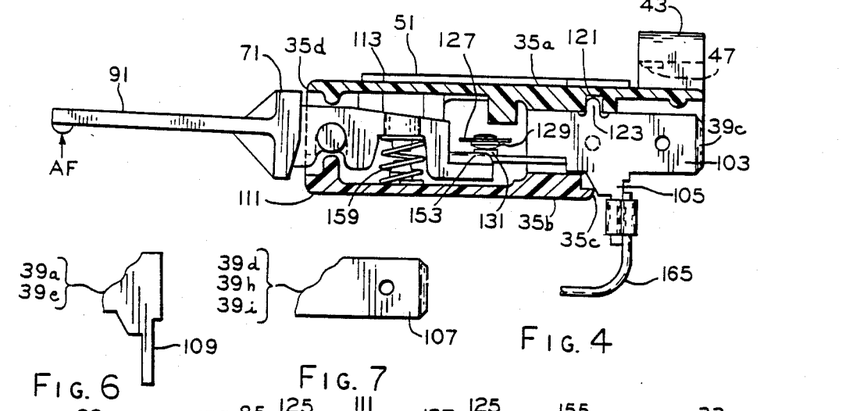
FIGS. 6 and 7 are partial side elevational views illustrating the configurations of the electrical connector sections of other terminals of the switch and terminal assembly as compared with that of the terminal illustrated in FIG. 3, respectively.

Switch and terminal assembly 21 has another opening or aperture 63 extending through casing 33 so as to intersect with wall 35a and another of the walls 35b of the casing generally opposite wall 35a thereof, and opening 63 is isolated from chamber means 37 within the casing, as best seen in FIGS. 13 and 14. While opening 63 is disclosed as extending through casing 33, it is contemplated that the opening may extend only in part therethrough so as to intersect only with wall 35a of the casing within the scope of the invention so as to meet at least some of the objects thereof. Terminals 39a-39i are disposed along another of the walls 35c of casing 33 with wall 35c being interposed between opposite walls 35a, 35b of the casing, as best seen in FIG. 8, and another opening or aperture 65 is provided through ground strap 51 of the ground terminal so as to be arranged generally in alignment with opening 63 through the casing when switch and terminal assembly 21 is mounted in its assembly position to end frame 22, as best seen in FIG. 13. A generally annular flange 67 is intergrally provided on ground strap 51 about opening 65 therethrough, and the ground strap flange protrudes into opening 63 in casing 33 so as to extend generally thereabout. A pair of switch means actuating arms 69, 71 are pivotally arranged in casing 33 and extend exteriorly thereof through another of the walls 35d of the casing with wall 35d being arranged generally opposite wall 35c and interposed between opposite walls 35a, 35b of the casing, as best seen in FIGS. 3, 4 and 14. Brackets 41, 43 comprise a pair of generally L-shaped flanges 73, 75 extending generally beyond wall 35a of casing 33 and having a pair of free end portions 77, 79 arranged so as to extend generally in parallel spaced apart relation with wall 35a of the casing, as best seen in FIG. 8. Deformable or shearable sections 45, 47 are provided on free end portions 77, 79 of flanges 73, 75 and extend in a direction away from the free end portions generally toward wall 35a of casing 33.

When switch and terminal assembly 21 is assembled or mounted to end frame 22, casing 33 is placed or inserted at least in part between opposite end face 27 of the end frame 22 and core 53 of dynamoelectric machine 23, and actuating arms 69, 71 which extend from wall 35a of the casing are disposed or otherwise positioned on opposite side portions of rotatable assembly 55 of the dynamoelectric machine, as best seen in FIGS. 1 and 10. Of course, actuating arms 69, 71 of switch and terminal assembly 21 are arranged for driven engagement with a centrifugal mechanism 72 of rotatable assembly 55 when the switch and terminal assembly is disposed in its assembly or mounted position on dynamoelectric machine 23, as discussed in greater detail hereinafter. Upon the placement of switch and terminal assembly 21 between opposite face 27 of end frame 22 and core 53, as best seen in FIG. 1, wall 35a on casing 33 is positioned at least generally adjacent opposite face 27 of the end frame with ground strap 51 of ground terminal 49 interposed between casing wall 35a and opposite face 27 of the end frame, as illustrated in FIG. 11. Thus, ground strap 51 is disposed in abutment or ground connection with opposite face 27 of end frame 25. At least generally simultaneously with the association of casing wall 35a and ground strap 51 with opposite face 27 of end frame 22, as discussed above, flanges 73, 75 of brackets 41, 43 on casing 33 are aligned with slots 57, 59 in end frame 22, as best seen in FIG. 10. Deformable sections 45, 47 on free end portions 77, 79 of flanges 73, 75 are engaged or abutted against surface means 49, 50 of the end frame at least adjacent the intersection thereof with opposite face 29 of the end frame; however, while the association of brackets 41, 43 with end frame are identical, only the association of bracket 43 with the end frame is shown in FIGS. 11 and 13 for the sake of drawing simplicity. An assembly force, as indicated by the force arrow F in FIG. 12, may then be applied onto switch and terminal assembly 21 in a direction generally perpendicular to peripheral edge 31 of end frame 22, and in response to the application of assembly force F on the switch and terminal assembly, flanges 73, 75 on casing 33 are moved into slots 57, 59 in the end frame toward the seated or assembly positions thereof, respectively. During this movement of casing flanges 73, 75 into slots 57, 59 in end frame 22, at least a portion of deformable sections 45, 47 are sheared or otherwise displaced therefrom against surface means 49, 50 generally at the intersection thereof with opposite face 29 of the end frame, respectively; however, while shearing of the deformable section is disclosed herein, it is contemplated that such deformable section may be only deformed when so forced into engagement with the surface means of the end frame within the scope of the invention so as to meet at least some of the objects thereof. Upon the shearing of a portion of deformable sections 45, 47 therefrom, as discussed above, the remaining portions of the deformable sections on free end portions 77, 79 of casing falnges 73, 75 are passed into releasable gripping engagement with opposite face 29 on end frame 22 generally adjacent slots 57, 59 thereof, and the flanges are disposed in the assembly positions thereof within the slots in the end frame, respectively, as best seen in FIG. 13. It may be noted that in the assembly positions thereof, casing flanges 73, 75 may be engaged with the bottoms of slots 57, 59 in end frame 22 or may be spaced adjacent the bottoms of the slots within the scope of the invention so as to meet at least some of the objects thereof. Upon the above discussed movement of flanges 73, 75 to the assembled positioned thereof in slots 57, 59 of end frame 22, openings 63, 65 in casing 33 and ground strap 51 are generally aligned with opening 61 through end frame 22, as best seen in FIG. 13. While end frame 22 is provided with slots 57, 59 to receive casing flanges 73, 75, as discussed above, it is contemplated that free end portions 77, 79 of hanger brackets 41, 43 may be angularly repositioned, i.e., to extend downwardly instead of outwardly from the casing flanges (as seen in FIG. 8) wherein the casing flanges would extend over peripheral edge 31 of the end frame thereby to eliminate the need for such slots within the scope of the invention so as to meet at least some of the objects thereof. To complete the description of the assembling method, a metallic ground device, such as a self-tapping machine screw 81 or the like for instance, is extended into the aligned openings 61, 63, 65 into ground circuit relation with both ground strap 51 and opposite face 29 of end frame 22 and into releasable displacement preventing engagement with the casing within at least a part of opening 63 therein, as best seen in FIGS. 13 and 14.

While ground strap 51 is abutted in ground connection against opposite face 27 of end frame 22, as previously mentioned, the threading engagement of ground device or self-tapping screw 81 with casing 33 when a head 83 of the screw is engaged with opposite face 29 of the end frame is effective to urge casing wall 35a toward the ground strap thereby to enhance its ground connection with opposite face 27 of the end frame. Further, upon the entry of screw 81 into opening 65 of ground strap 51, the screw self-taps into threaded engagement with annular flange 67 of the ground strap extending about its opening thereby to ensure the ground connection between the ground strap and the end frame, as best seen in FIG. 14. Of course, while annular flange 67 is disclosed for threaded engagement with screw 81, as discussed above, it is contemplated that such annular flange may be omitted from the ground strap with the screw merely threading into an opening provided through the ground strap within the scope of the invention so as to meet at least some of the objects thereof. In addition to the foregoing, there is always the possibility that undesirable warpage of end frame 22 may occur due to improper handling techniques and thermal shrinkage and/or expansion of the metallic material from which the end frame is formed; however, the releasable gripping engagement of deformable sections 45, 47 of casing brackets 41, 43 with the end frame and the releasable gripping engagement of screw 81 with the end frame and casing 33 provides a stable three point mounting arrangement of switch and terminal assembly 21 to the end frame which is believed to compensate at least in part for warpage which may be present in the end frame. For convenience of disclosure and for the sake of drawing simplicity, switch and terminal assembly 21 has been described as being mounted to end frame 22 when it is assembled to dynamoelectric machine 23; however, it is contemplated that the switch and terminal assembly may be mounted to the end frame while it is disassociated from the dynamoelectric machine within the scope of the invention so as to meet at least some of the objects thereof.

With reference again in general to the drawings and recapitulating at least in part with respect to the foregoing, switch and terminal assembly 21 in one form of the invention is provided with casing 33, and terminal plurality 39a–39i is associated with the casing with terminals 39a, 39d, 39e, 39f and 39h defining switch or switch means terminals extending both exteriorly and interiorly of the casing, respectively (FIGS. 2-4 and 8). A pair of switch means 85, 87 are associated with switch terminals 39a, 39d and 39c, 39f, 39h interiorly of casing 33 and are operable generally for switching between a pair of switching modes, respectively (FIGS. 2-5). A pair of actuating means, such as activating arms 69, 71 or the like for instance, are pivotally or rockably movable in casing 33 and operable generally for effecting the operation of switch means 85, 87 between the switching modes thereof, and the actuating means or arms include a pair of means, such as extensions 89, 91 or the like for instance, extending exteriorly of the casing for receiving an applied force to effect the pivotal movement of the actuating arms and the operation thereby of the switch means, respectively (FIGS. 2-4 and 10).

More particularly and with specific reference to FIGS. 2-10, terminals 39a–39i define a plurality of sets of terminals indicated generally at 97, 99, 101 in FIG. 8, and the terminals in the sets thereof are mounted or captured in casing 33 so as to be disposed generally in row formation along wall 35c thereof, as discussed in greater detail hereinafter. Terminals 39b, 39c, 39f, 39g in terminal set 97 include a pair of electrical connector sections 103, 105 arranged generally in planar and angular relation with dissimilar configurations and extending in the row formation with each other exteriorly of casing 33, respectively, with electrical connector section 105 being adapted to be crimpable. The dissimilar configurations of electrical connector sections 103, 105 of terminals 39b, 39c, 39f, 39g are best seen in FIGS. 3 and 4 on terminals 39f, 39c illustrated therein, respectively. Electrical connector sections 103 on the terminals in terminal set 97 extend in the row formation thereof only beyond wall 35c of casing 33, and electrical connector sections 105 of the terminals in terminal set 97 extend in the row formation thereof beyond both wall 35b and wall 35c of the casing, respectively. Terminals 39d, 39h, 39i in terminal set 99 have only one electrical connector section 107 with a configuration similar to that of electrical connector sections 103 on the terminals in terminal set 97 and arranged so as to extend in the row formation therewith only beyond wall 35c of casing 33. The configuration of electrical connection section 107 of terminals 39d, 39h, 39i in terminal set 99 is best seen in FIG. 7. Terminals 39a, 39e in terminal set 101 also have only one electrical connector section 109, as illustrated in FIG. 6, with a configuration similar to that of electrical connector sections 105 on the terminals in terminal set 97 and arranged so as to extend in the row formation therewith beyond both wall 35b and wall 35c of casing 33. In the light of the foregoing it may be noted that similar electrical connector sections 105, 109 in terminal sets 97, 101 are arranged to extend in row formation beyond walls 35d, 35c of casing 33 so as to be predisposed for ease of connection with winding circuitry of core 53 in dynamoelectric machine 23 when switch and terminal assembly 21 is assembled thereto, as discussed in greater detail hereinafter. Also, similar electrical connector sectioins 103, 107 in terminal sets 97, 99 are angularly disposed with respect to electrical connector sectioins 105, 109 and are arranged to extend in row formation beyond only wall 35c of casing 33 for ease of receiving a multiple connection assembly when dynamoelectric machine 23 is connected in circuit relation through switch and terminal assembly 21 across a power source, as discussed in greater detail hereinafter. While a certain number of terminals have been specified and disclosed herein in terminal sets 97, 99, 101, it is contemplated that a greater or lesser number of such terminals may be employed in any one of such terminal sets within the scope of the invention so as to meet at least some of the objects thereof. For instance, one of the terminals sets may include only one terminal. Further, it is also contemplated that terminals having electrical connector sections with configurations different than those disclosed herein may be utilized within the scope of the invention so as to meet at least some of the objects thereof. It may also be noted that terminals 39b, 39c, 39g are dummy terminals which may be provided for the ease of making connection through switch and terminal assembly 21.

Casing 33 generally comprises a pair of casing members 111, 113 formed of any suitable dielectric material and which are adapted to be secured together by suitable means, such as rivets or eyelets 115 or the like for instance. While casing members 111, 113 are shown herein as being mating sections or generally half-sections, it is contemplated that the casing members may have other forms and may be either fixed secured together or releasably secured together by means other than those disclosed herein within the scope of the invention so as to meet at least some of the objects thereof. When casing members 111, 113 are secured together or joined in assembly relation, switch means accommodating chamber 37 is defined within wall plurality 35 of casing 33. Means, such as for instance a hub portion 115 or the like, is integrally provided on casing wall 35a extending toward abutment with wall 35b for defining opening 63 through casing 33 intersecting with opposite walls 35a, 35b thereof and isolative form chamber 37, as best seen in FIG. 14. While chamber 37 is illustrated herein as a pair of separate cavities within casing 33, it is contemplated that such cavities may be interconnected or communicated with each other so as to define a unitary chamber within the scope of the invention so as to meet at least some of the objects thereof.

Figure 2:
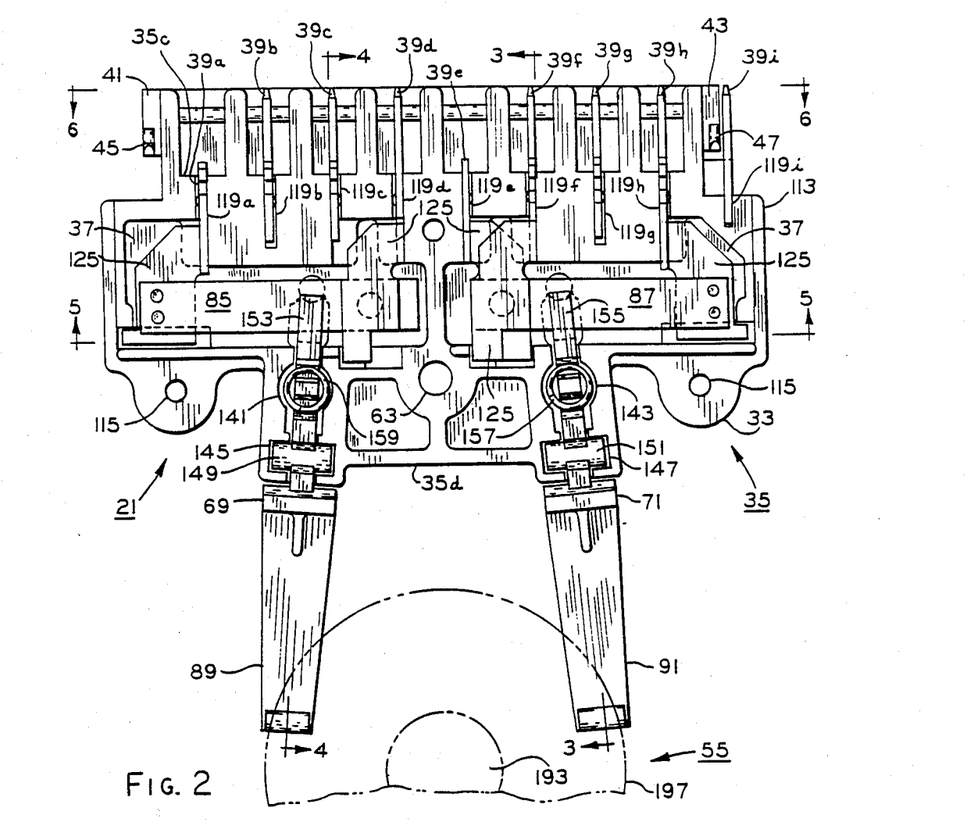
FIG. 2 is a greatly enlarged plan view of the switch and terminal assembly illustrated in FIG. 1 with one of the casing members removed to show the internal components of the switch and terminal assembly.

Casing 33 has a plurality of terminal slots or openings 119a–119i disposed or extending in spaced apart relation and generally aligned in row formation along wall 35c of the casing so as to intersect therewith, as best seen in FIG. 2, and terminal slots 119a, 119d, 119e, 119f, 119h extend through casing wall 35c intersecting with chamber 37. A plurality of notches or recesses 121 are provided in casing wall 35a intersecting with terminal slots 119a–119h generally adjacent the intersection of walls 35a, 35c, respectively, as best seen in FIGS. 3 and 4. Thus, with terminals 39a–39h disposed or captured in terminal slots 119a–119h in casing wall 35c, a plurality of fingers or extensions 123 on such terminals are received in notches 121 thereby to maintain such terminals against displacement from such terminal slots, respectively. While notches 121 intersect with terminal slots 119a–119h and extensions 123 on terminals 39a–39h are received in the notches, as discussed above, only intersecting notches 121 and terminal slots 119i, 119f with extensions 123 of terminals 39c, 39f received therein are illustrated in FIGS. 3 and 4 for the sake of drawing simplicity. Ground terminal notch 119i extends through both walls 35a, 35c of the casing so that ground terminal 39i may be removably associated therewith until switch and terminal assembly 21 is mounted by ground screw 81 to end frame 22 of dynamoelectric machine 23 with ground strap 51 interposed between casing wall 35 and opposite face 27 of the end frame, as previously discussed.

Figure 5:
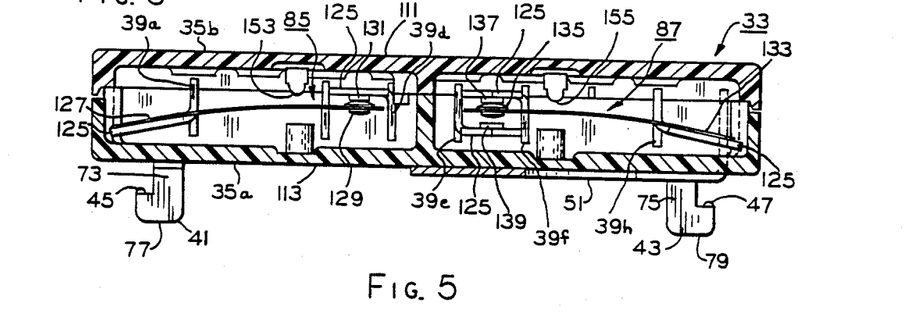

Switch terminals 39a, 39d, 39e, 39f, 39h extend through terminal slots 119a, 119d, 119e, 119f, 119h in casing wall 35c and have integral switch or switch means supporting sections 125 disposed within chamber 37 in positioning engagement with casing 33, respectively, as best seen in FIG. 2 and 5. Supporting sections 125 of terminals 39a and 39h within chamber 37 respectively support switch means 85, 87 which, as previously mentioned, are adapted for movement between switching modes or switching positions. As best seen in FIG. 5, switch means 85 includes a movable resilient switch element 127 pivotally secured to supporting section 125 of terminal 39a, and a contact 129 adjacent the free end of the switch element is urged toward a switching position making with a stationary switch element or contact 131 on supporting section 125 of terminal 39d. Switch means 87 includes a movable resilient switch element 133 pivotally secured to supporting section 125 of terminal 39h, and a double contact 135 adjacent the free end of the switch element is urged toward a switching position making with a stationary switch element or contact 137 on supporting section 125 of terminal 39f and broken from another stationary switch element or contact 139 on supporting section 125 of terminal 39e.

Another pair of means, such as pivot openings 141, 143 or the like for instance, for pivotally receiving actuating arms 69, 71 are provided in casing 33 intersecting between wall 35d thereof and chamber 37, and the openings include a pair of cross pivot or bearing bores 145, 147 intersecting therewith and arranged generally adjacent casing wall 35d, respectively, as best seen in FIG. 2. A pair of means, such as pivot pins 149, 151 or the like for instance, for pivotally mounting actuating arms 69, 71 in casing 33 are integrally provided on the actuating arms and are journaled or otherwise pivotally arranged in bearing bores 145, 147 of openings 141, 143 in casing 33, respectively. Extensions or lower end portions 89, 91 of actuating arms 69, 71 extend through openings 141, 143 from wall 35d of casing 33 exteriorly thereof, and albeit not shown, it is contemplated that an overtravel device, such as a leaf spring or the like for instance, may be associated with the extensions of the actuating arms in order to compensate for overtravel of centrifugal mechanism 72 on rotatable assembly 55 upon the operation of dynamoelectric machine 23 within the scope of the invention so as to meet at least some of the objects thereof. The upper or opposite end portions of actuating arms 69, 71 extend into chamber 37 defining a pair of means, such as for instance abutments 153, 155 or the like, for operating engagement with switch elements 127, 133 so as to effect the movement of the switch elements between the switching positions thereof in response to the pivotal movement of the actuating arms, respectively. A pair of resilient means, such as for instance springs 157, 159 or the like, are biased between casing 33 and actuating arms 69, 71, and for purposes of disclosure, springs 157, 159 are illustrated in their compressed state showing the actuating arms pivoted about pivot pins 149, 151 in response to an actuating force, indicated by the force arrows AF in FIG. 1, 3 and 4, transmitted to actuating arms 69, 71, as discussed in greater detail hereinafter. While pivot pins 149, 151 are disclosed herein as being integral with actuating arms 69, 71 and pivotally arranged with bearing bores 145, 147 of casing 33, it is contemplated that other means may be movably arranged in a different manner with the casing to effect the switching operations of switch elements 127, 133 within the scope of the invention so as to meet at least some of the objects thereof.

With reference again to the drawings in general and again recapitulating at least in part with respect to the foregoing, dynamoelectric machine 23 in one form of the invention has a stationary assembly 161 which includes core 53 having winding means or circuitry 163 thereon adapted for excitation and a plurality of winding means leads or lead ends 165 extending from the core toward a structural component, such as end frame 22 or the like for instance, of the stationary assembly (FIG. 1). Rotatable assembly 55 is rotatably associated with stationary assembly 161 in magnetic coupling relation with core 53 so as to be rotatable from an at-rest position to a preselected rotational speed upon the excitation of winding means 163. Switch and terminal assembly 21 is mounted to end frame 22 of stationary assembly 161 and includes chamber 37 therein with terminals 39 having at least one electrical connector section, such as for instance those indicated at 103, 105, 107, 109, extending exteriorly of the switch and terminal assembly (FIG. 1-4 and 6-8). It may be noted that electrical connector sections 105 and 109 of terminals 39a, 39b, 39c, 39f, 39g and 39a, 39e, respectively, are sized so as to be directly interconnected together by crimping with winding means leads 165; however, for the sake of drawing simplicity, only electrical connector sections 105 of terminal 39c is shown directly crimped with one of the winding means leads 165 in FIG. 4. Nevertheless, it is contemplated that means other than crimping, such as for instance quick disconnect fittings or the like, may be employed to interconnect the aforementioned electrical connector sections and winding means leads within the scope of the invention so as to meet at least some of the objects thereof. If a more detailed discussion is desired with respect to the crimping of winding means leads 165 directly to the electrical connector sections of the terminals, as described above, reference may be had to the aforementioned James L. King application filed concurrently herewith. Switch terminals 39a, 39h support movable switch means, such as switch elements 127, 133 for instance, operable generally for making with and breaking from other switch means, such as stationary switch elements or contacts 131 and 137, 139 supported on switch terminals 39d and 39e, 39f within switch and terminal assembly 21, respectively (FIGS. 3-5). A pair of means, such as for instance actuating arms 69, 71, are pivotally movable in switch and terminal assembly 21 for controlling the operation of switch elements 127, 133 between the switching positions thereof, and the controlling means or actuating arms include extension means 89, 91 conjointly pivotally movable therewith and extending exteriorly of the switch and terminal assembly generally adjacent opposite sides of rotatable assembly 55 between core 53 and end frame 25 of stationary assembly 161, respectively (FIGS. 1 and 10). Means, such as a centrifugal mechanism 72 or the like for instance, is conjointly rotatable with rotatable assembly 55 and operable generally at least as the rotatable assembly attains its preselected rotational speed for effecting the conjoint pivotal movement of actuating arms 67, 69 and the operation thereby of switch elements 127, 133 from one of the switching positions to the other of the switching positions thereof, respectively (FIGS. 1, 5 and 10).

More particularly and with specific reference to FIG. 1, stationary assembly 161 of dynamoelectric machine 23 comprises core or stator 53 having a pair of generally opposite end faces 169, 171 which are respectively intersected by a bore 173 extending generally axially through the core. A plurality of generally radially disposed winding means accommodating slots 175 are also provided in core 53 intersecting with both bore 173 and opposite end faces 169, 171 thereof, respectively. Winding means 163, such as a plurality of conductor turns or coils thereof, is disposed in slots 175 having suitable insulation therebetween, and the winding means has a pair of opposite, generally annular groupings of end turns 177, 179 thereof disposed generally about bore 173 of core 53 adjacent opposite end faces 169, 171 thereof, respectively.

A plurality or set of beams 181 are associated or otherwise fixedly secured to core 53 at least generally adjacent the outer peripheral surface thereof, and if a more detailed discussion of the securement of the beams and core is desired, reference may be had to U.S. Pat. No. 3,858,067 issued Dec. 31, 1974 to Charles W. Otto which is incorporated herein by reference. Opposite end portions of beams 181 are secured by suitable means, such as a plurality of welds 183 or the like for instance, to end frame 22 and another end frame 185 opposite thereto so as to arrange the opposite end frames in opposed spaced relation with opposite end faces 169, 171 of core 53. If a more detailed discussion of the opposite end portions of beams 181 and the securement thereof to end frames 22, 185 is desired, reference may be had to the aforementioned U.S. Pat. No. 4,473,764 of Robert W. White. Further, while the particular beams 181 and the securement thereof to end frames 22, 195 are illustrated herein for purposes of disclosure, it is contemplated that other means secured in different manners to either the core and the opposite end frames may be employed in stationary assembly 161 within the scope of the invention so as to meet at least some of the objects thereof. While end frames 22, 185 are each formed of a similar electrical conductive material, such as sheet steel or the like for instance, as previously mentioned, and are similarly shaped, it is contemplated that the end frames may be dissimilar within the scope of the invention so as to meet at least some of the objects thereof. A pair of means, such as generally cup-shaped containers 187, 189 or the like for instance, are secured by suitable means, such as crimping for instance, to end framds 22, 185 generally about central portions thereof so as to extend generally axially toward opposite end faces 169, 171 of core 53 for containing a pair of lubrication and bearing systems (not shown) adapted to lubricate and journal rotatable assembly 55, respectively. If a more detailed discussion of containers 187, 189, the securement thereof to end frames 22, 185, and the lubrication and bearing systems is desired, reference may be had to the commonly assigned Charles W. Otto application Ser. No. 377,554 filed May 12, 1982 (now U.S. Pat. No. 4,466,165 issued Aug. 21, 1984) which is incorporated herein by reference.

Rotatable assembly 55 comprises a rotor 191 which is mounted to a shaft 193 so as to be conjointly rotatable therewith. Rotor 191 is rotatably disposed at least in part within bore 173 of core 53 with a generally uniform air gap therebetween and is arranged in magnetic coupling relation with the core upon the excitation of winding means 163. Opposite end portions of shaft 193 are associated in lubrication and journaled relation with the lubrication and bearing systems supported by containers 187, 189 on opposite end frames 22, 185, as previously mentioned, and the opposite end portions of the shaft extend through a pair of generally central openings (not shown) provided therefor in the opposite end frames, respectively.

Centrifugal mechansim 72 is arranged on shaft 193 so as to be conjointly rotatable therewith, and the centrifugal mechanism is spaced or located between rotor 191 and container 187 on end frame 22. Centrifugal mechanism 72 is provided with means, such as a hub portion 195 or the like for instance, for mounting engagement about shaft 193 thereby to secure the centrifugal mechanism for conjoint rotation with the shaft. A generally annular push collar 197 is disposed about the shaft so as to be axially movable with respect to mounting means or hub portion 195, and a generally radially extending, force transmitting face or surface 199 is provided on the push collar facing toward container 187 on end frame 22 and actuating arms 69, 71 of switch and terminal assembly 21. As discussed in greater detail hereinafter, push collar 197 is generally axially movable with respect to shaft 193 from a protracted position spaced adjacent container 187 and abutted with actuating arms 69, 71 of switch and terminal assembly 21 toward a retracted position in response to the rotation of rotatable assembly 55 from the at-rest position to the preselected rotational speed thereof. Resiliently urged means, such as a pair of centrifugal weight members 201 with a pair of springs 203 biased therebetween for instance, is associated with hub portion 195 and push collar 197 is operable generally for exerting force AF urging the push collar toward its protracted position with surface 199 thereof in actuating or force transmitting engagement with extensions 89, 91 on actuating arms 69, 71 of switch and terminal assembly 21. While springs 203 are described herein as being interposed between weights 201, only one of the springs is shown in FIG. 1 for the sake of drawing simplicity. With switch and terminal assembly 21 mounted in its assembly position to end frame 22, actuating arms 69, 71 of the switch and terminal assembly extend therefrom on opposite sides of shaft 193 so as to be axially disposed between container 187 on end frame 22 and surface 199 of push collar 197 in the force transmitting engagement therewith, as previously mentioned. If a more detailed description of the construction and operation of centrifugal mechanism 72 is desired, reference may be had to U.S. Pat. No. 4,208,559 issued June 7, 1980 to Steven J. Gray which is incorporated herein by reference.

Figure 15:
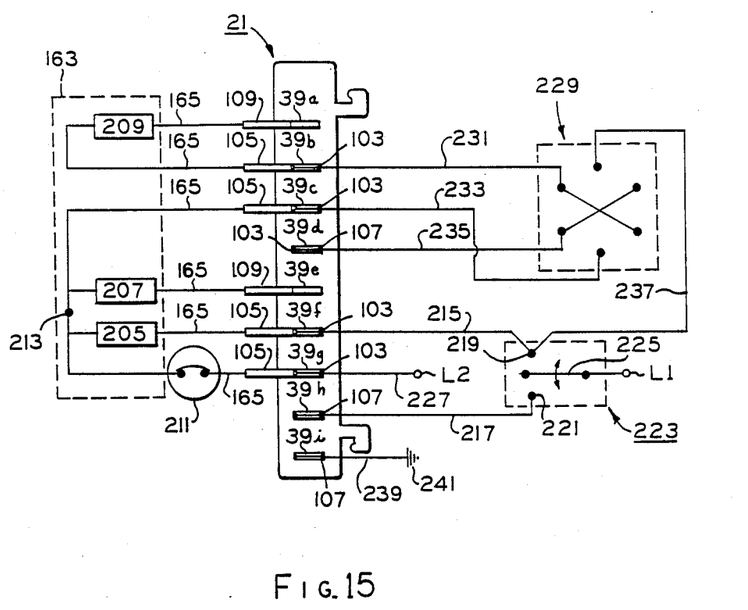
FIG. 15 is an exemplary schematic wiring diagram of the dynamoelectric machine and the switch and terminal assembly illustrating the connection thereof with a power source.

In FIG. 15, switch and terminal assembly 21 is utilized as a switch and electrical circuit making unit arranged in an exemplary circuit in circuit controlling relation with winding means 163 of dynamoelectric machine 23 which is shown, for example, as a single phase, multispeed induction motor. In this illustrated exemplification, winding means 163 of dynamoelectric machine comprises two run or main field windings 205, 207 (e.g., four pole and six pole windings, respectively) selectively energized to provide two different speeds of operation and a four pole start or auxiliary winding 209 connectable in parallel with run winding 205 during starting conditions. Of course, these main and run windings may be arranged on core 53 of stationary assembly 161 of dynamoelectric machine 23 (as best seen in FIG. 1) and interconnected in any suitable manner. A pair of winding lead ends 165 of start winding 209 connect it across electrical connector sections 109, 105 of terminals 39a, 39b, respectively. Main winding 207 is connected across electrical connector sections 105, 109 of terminals 39c, 39e by a pair of winding lead ends 165 of main winding 207, and main winding 207 is connected across electrical connector sections 105 of terminals 39f, 39g by a pair of winding lead ends 165, respectively. An overload 211 is interposed in winding lead 165 connecting main winding 205 with electrical connector section 105 of terminal 39g, and main windings 205, 207 are interconnected at a common connection point 213.

A pair of leads 215, 217 are respectively interposed between electrical connector sections 103, 107 of terminals 39f, 39h and a pair of terminal posts 219, 221 of a single pole double throw speed selector switch 223. Speed selector switch 223 has a movable switch arm 225 for selective circuit making engagement with its cooperating posts 219, 221, and the switch arm is connected in circuit relation with a line terminal L1. Another line terminal L2 is connected by a lead 227 with electrical connector section 103 of terminal 39g, and, of course, line terminals L1, L2 define a power source. A double pole double throw reversing switch of a type well known in the art is illustrated schematically at 229 for controlling the direction of current through start winding 209 and, consequently, the direction of rotation of dynamoelectric machine 23. A pair of leads 231, 233 connect reversing switch 229 in circuit with electrical connector sections 103 of terminals 39b, 39c, and another lead 235 connects the reversing switch to electrical connector section 107 of terminal 39d which is a dummy terminal. To complete the description of the exemplary circuit of FIG. 15, a lead 237 connects reversing switch 229 with terminal post 219 of speed selector switch 223, and a ground lead 239 connects electrical connector section 107 of ground terminal 39i to ground at 241. Albeit not shown for the purpose of drawing simplicity, it is contemplated that a multiple connector assembly of a type well known to the art may be employed to interconnect leads 215, 217, 227, 231, 233, 235, 237 with respective electrical connector sections of the terminals, as discussed hereinabove.

In the operation of dynamoelectric machine 23 assume that the components thereof are disposed in the positions shown in the drawings as described hereinabove. To effect the operation of dynamoelectric machine 23 at its high speed, switch arm 225 of speed selector switch 223 may be engaged with its cooperating post 219 thereby to connect four pole run winding 205 across line terminals L1, L2 through leads 215, 227 and terminals 39f, 39g. At the same time, start winding 209 is also energized through reversing switch 229 which may be connected across line terminals L1, L2 to effect current flow through lead 231, terminal 39b, switch element 127 in engagement with contact 131 on terminal 39d in FIGS. 4 and 5, and leads 235, 237. In this manner, both start and run windings 205,209 are energized to effect the starting operation of dynamoelectric machine 23, and as the dynamoelectric machine comes up to its preselected speed, weight 201 of centrifugal mechanism 72 are centrifugally moved outwardly against springs 203 effecting the axial movement of push collar 197 from its protracted position to its retracted position (as shown in dotted outline in FIG. 1). Upon this axial movement of push collar 197 to its retracted position, surface 199 of the push collar is disengaged from actuating arms 69, 71 of switch and terminal assembly 21 thereby to remove actuating force AF from the actuating arms. Thus, the removal of actuating force AF from actuating arms 69, 71 allows them to pivots about their pivot 149, 151 in response to the compressive forces of springs 157, 159 acting on the actuating arms, as illustrated in FIGS. 2-4. The pivotal movement of actuating arm 69 effects the movement of switch element 127 toward its switching position disengaging contact 129 on switch element 127 from contact 131 on terminal 39d, and the pivotal movement of actuating arm 71 effects the movement of switch element 133 toward its switching position disengaging double contact 135 on switch element 133 from contact 137 on terminal 39f and making the double contact with contact 139 on terminal 39e. Of course, the breaking of switch elements 127, 133 from contacts 131, 137 on terminals 39d, 39f, respectively, interrupts the circuit across reversing switch 229 to start winding 209 thereby to take it off the line, and dynamoelectric machine 23 is thereafter energized by run winding 205.

In order to effect the starting and running operation of dynamoelectric machine 23 at its low speed, switch arm 225 of speed selector switch 223 may be moved into engagement with its cooperating terminal post 221 thereby to connect run winding 205 across line terminals L1, L2 through lead 217, terminal 39h, switch element 133 in making engagement with contact 137 on terminal 39f, run winding 205, terminal 39g, and lead 227. At the same time, start winding 209 is also energized through reversing switch 229 which may be connected across line terminals L1, L2 through the same circuitry as previously described hereinabove, In this manner, both run and start windings 205, 209 are energized to effect the starting operation of dynamoelectric machine 23, and as rotatable assembly 55 of the dynamoelectric machine comes up to its preselected speed, centrifugal mechanism 72 is operated to effect the pivotal movement of actuating arms 69, 71 in switch and terminal assembly 21 in the same manner as previously described hereinabove. Again, the pivotal movement of actuating arm 69 effects the movement of switch element 127 toward its switching position disengaged from contact 131 on terminal 39d thereby to take run winding 209 off the line. Also the pivotal movement of actuating arm 71 effects the movement of switch element 133 toward its switching position breaking from contact 137 on terminal 39f so as to take run winding 207 off the line and making with contact 139 on terminal 39e thereby to place six pole run winding 207 across the line so that dynamoelectric machine 23 will run at its slow speed. Further, the pivotal movement of actuating arm 71 to effect the breaking of switch element 133 from contact 137 on terminal 39f acts to take reversing switch 229 off the line so long as run winding 207 remains energized to operate dynamoelectric machine 23 at its slower speed.

While switch and terminal assembly 21 is disclosed in conjunction with a single phase, multispeed induction motor, it is to be understood that such assembly may also be employed with other types of motors within the scope of the invention so as to meet at least some of the objects thereof. Further, in some applications of switch and terminal assembly 21, the switch means portion thereof including switch element 127 may be employed to control an auxiliary circuit other than the winding circuitry of dynamoelectric machine 23, as is well known in the art, within the scope of the invention so as to meet at least some of the objects thereof.

An alternative switch and terminal assembly 251 along with an alternative method of assembling such with end frame 22 is illustrated in FIGS. 16-20 Switch and terminal assembly 251 has generally the same component parts functioning generally in the same manner in dynamoelectric machine 23 as the previously described switch and terminal assembly 21 with the exceptions discussed hereinafter, and while switch and terminal assembly 251 meets at least one of the objects set out above, it is believed that switch and terminal assembly 251 has indigenous objects as will be in part apparent and in part pointed out in the following discussion.

Figure 16:
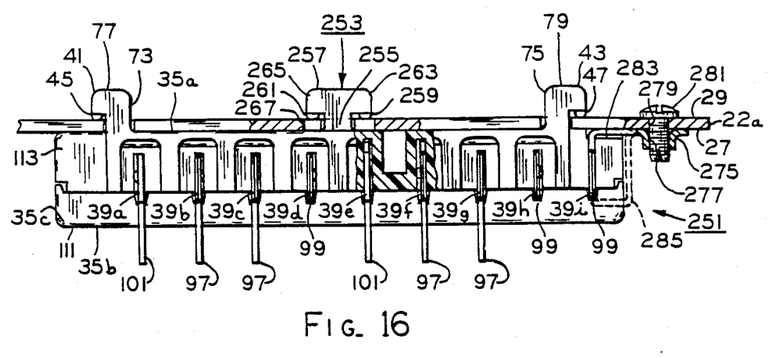
FIG. 16 is a top elevational view of an alternative switch and terminal assembly in one form of the invention and illustrates principles which may be practiced in an alternative method of assembling such switch and terminal assembly to an alternative end frame for the dynamoelectric machine.

Switch and terminal assembly 251 may be assembled or mounted to an end frame 22a of dynamoelectric machine 23 either when the end frrame is disassociated from the dynamoelectric machine or while the end frame is secured to beams 181 of the dynamoelectric machine (not shown) in the same manner as the previously discussed securement of end frame 22 to the beams. In switch and terminal assembly 251, the set of mounting means on casing 33 includes brackets 41, 43 and another hanger bracket 253, as best seen in FIG. 16. Bracket 253 comprises a pair of generally T-shaped flanges 255, 257 extending generally beyond wall 35a of the casing. Flange 255 has one end thereof integrally connected with wall 35a of casing 33, and across flange 257 is integrally formed on the opposite end of flange 255 extending generally in parallel spaced apart relation with the casing wall. Another pair of deformable or shearable sections 259, 261 are provided on a pair of opposite free end portions 263, 265 of cross flange 257 and extend in directions away from the opposite free end portions generally toward wall 35a of casing 33. It may be noted that bracket 253 is disposed between brackets 41, 43 on casing wall 35a of switch and terminal assembly 251 while also being generally vertically spaced from brackets 41, 43 thereby to provide a three point mount for the switch and terminal assembly to ensure mounting stability, as discussed hereinafter.

Figures 16A, 20:
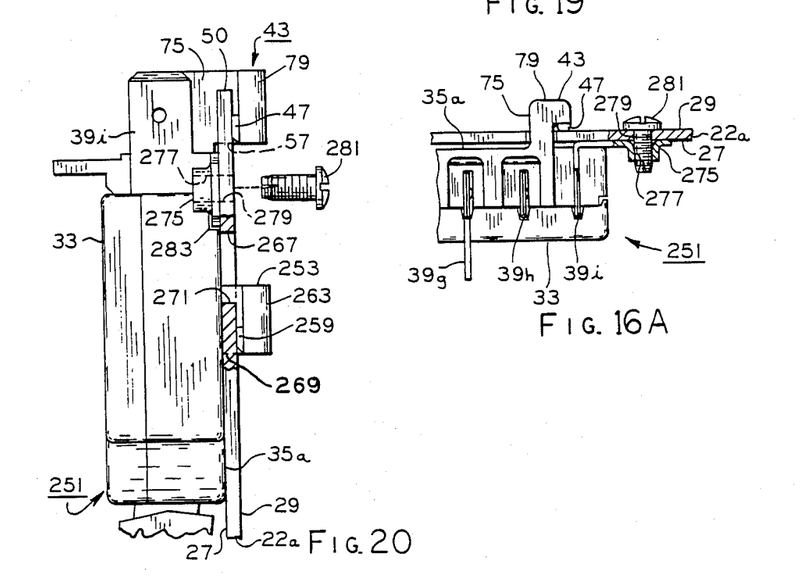
FIG. 16A shows a part of a ground strap for the alternative switch and terminal assembly abutted between a wall thereof and one opposite face of the alternative end frame also in one form of the invention.
FIGS. 18–20 are enlarged partial views taken from FIG. 17 further illustrating the method of assembling the alternative switch and terminal assembly to the alternative end frame for the dynamoelectric machine.
Figure 17:
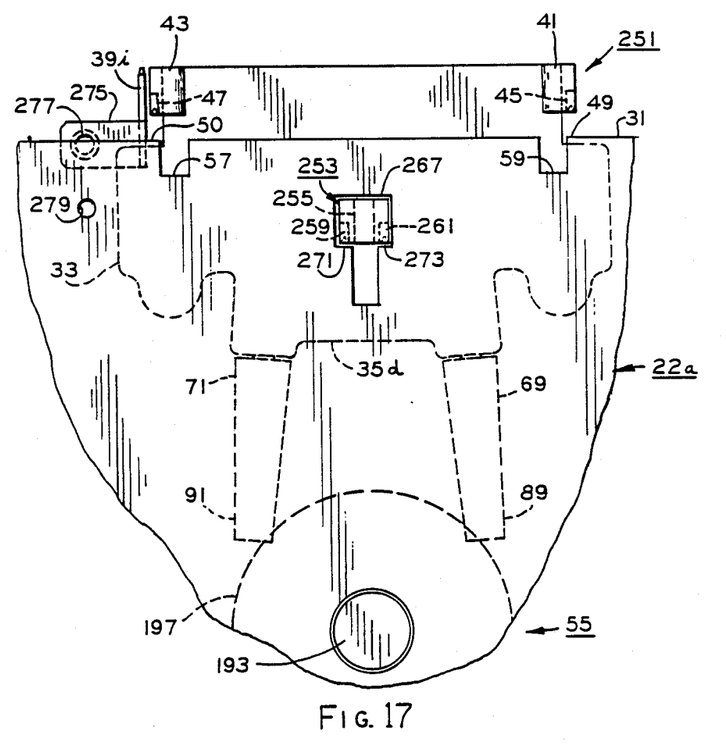
FIG. 17 is a partial right end elevational view of the alternative end frame for the dynamoelectric machine showing the alternative switch and terminal assembly disassociated therefrom.
Figure 18:
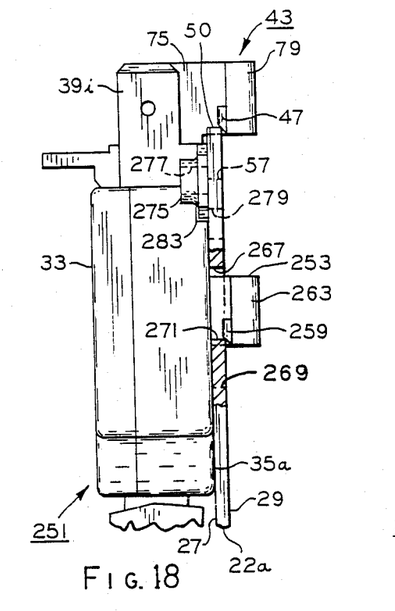
Figure 19:
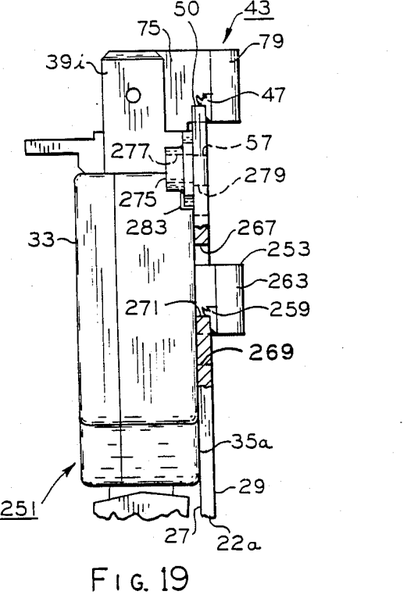

End frame 22a has means, such as another pair of intersecting slots or apertures 267, 269 or the like for instance, having a generally T-shaped configuration and intersecting with opposite faces 27, 29 of the end frame for receiving bracket, 253 on casing 33 of switch and terminal assembly 251 upon the assembly thereof with the end frame, as illustrated in FIG. 16. To effect the assembly of switch and terminal assembly 251 to end frame 22a, wall 35a of casing 33 is positioned at least generally adjacent opposite face 27 of the end frame, and flanges 73, 75 of brackets 41, 43 on the casing are aligned with slots 57, 59 in the end frame while bracket 253 is inserted through slot 267 in the end frame, as illustrated in FIG. 17. Deformable sections 45, 47 and 259, 261 are engaged or abutted against surface means 49, 50 and another pair of surface or surface means 271, 273 on end frame 22a at least adjacent the intersection thereof with opposite face 29 of the end frame, respectively as best seen in FIG. 18. Edges of slot 267 intersecting between opposite faces 27, 29 of end frame 22a comprise surface means 271, 273, respectively. While the association of brackets 41, 43 and opposite end portions 263, 265 of flange 257 of bracket 253 with end frame 22a are identical, only the association of bracket 43 and opposite end portion 263 of bracket 253 are shown in FIGS. 18-20 for the sake of drawing simplicity. The assembly force F may then be applied onto switch and terminal assembly 251 in the direction generally perpendicular to peripheral edge 31 of end frame 22a, and in response to the application of the assembly force F on the switch and terminal assembly, flanges 73, 75 on casing 33 are moved into slots 57, 59 in the end frame while flange 255 is moved into slot 269 in the end frame, respectively. During this movement of switch and terminal assembly 251 by the applied force F, at least a portion of deformable sections 45, 47 and 259, 261 are sheared or otherwise displaced against surface means 49, 50 and 271, 273 generally at the intersection thereof with opposite face 29 of end frame 22a; however, while shearing of the deformable sections is disclosed herein, it is contemplated that such deformable sections may be only deformed when so forced into engagement with the surface means of the end frame within the scope of the invention so as to meet at least some of the objects thereof. Upon the shearing of a portion of deformable sections 45, 47 and 259, 261 therefrom, as discussed above, the remaining portions of the deformable sections on free end portions 77, 79 and 263, 265 of casing flanges 73, 75 and 257 are passed into releasable gripping engagement with opposite face 29 on end frame 22a generally adjacent slots 57, 59 and 269 thereof, and flanges 73, 75 and 259 are disposed in the assembly positions within slots 57, 59 and 269 in the end frame, respectively, as best seen in FIG. 20. It may be noted that in the assembly positions thereof, casing flanges 73, 75, 255 may be engaged with the bottoms of slots 57, 59, 269 in end frame 22a or may be spaced adjacent the bottoms of the slots, respectively, within the scope of the invention so as to meet at least some of the objects thereof.

As shown in FIGS. 16 and 20, a ground strap 275 is connected with ground terminal 39i of switch and terminal assembly 251 extending therefrom in part in overlaying relation with wall 35a of casing 33 at least adjacent opposite face 29 of end frame 22a for interconnection in ground circuit engagement therewith. When switch and terminal assembly 251 is assembled to end frame 22a, as discussed above, a pair of openings 277, 279 in ground strap 275 and end frame 22a are arranged generally in alignment with each other, and a metallic ground device, such as a self-tapping machine screw 281 or the like for instance, is extended into the aligned openings 277, 279 into ground strap 275 and end frame 22a, respectively. While a recess 283 is provided in wall 35a on casing 33 of switch and terminal assembly 251 to accommodate or receive a part of ground strap 275, as best seen in FIG. 16, it is contemplated that such recess may be omitted so that such ground strap part is disposed in overlaying relation with casing wall 35a between it and opposite face 29 of the end frame, as illustrated in FIG. 16A, within the scope of the invention so as to meet at least some of the objects thereof. Furthermore, while ground strap 275 is provided with the shape or configuration provided with the shape or configuration illustrated in FIGS. 16 and 16A, it is also contemplated that other ground straps having different shapes, such as illustrated in dotted outline at 285 in FIG. 16 for instance, may be utilized within the scope of the invention so as to meet at least some of the objects thereof.

From the foregoing, it is believed that novel switch and terminal assemblies 21, 251 have been provided meeting the objects and advantageous features set out hereinbefore, as well as others, and it is contemplated that changes in the precise arrangements, shapes, details and connections of such switch may be made by those having ordinary skill in the art without departing from the spirit of the invention or the scope of the invention, as set out in the claims which follow.

What we claim as new and desire to secure by Letters Patent of the United States is:

1. A switch and terminal assembly comprising:

a casing having a plurality of wall means defining switch means accommodating chamber means within said casing;

a plurality of sets of terminals disposed in said casing along only one of said wall means thereof, said terminals in one of said terminals sets including a pair of electrical connector sections arranged generally in planar and angular relation with dissimilar configurations and extending generally in row formation with each other exteriorly of said casing, respectively, one of said electrical connector sections of said terminals in said one terminal set extending in the row formation thereof only beyond said one wall means of said casing and the other of said electrical connector sections of said terminals in said one terminal set extending in the row formation thereof beyond both said one wall means and another of said wall means of said casing generally adjacent said one wall means, respectively, said terminals in another of said terminals sets including only another one electrical connector section having a configuration similar to that of said one electrical connector section of said terminals in said one terminal set and arranged so as to extend in the row formation therewith only beyond said one wall means of said casing, respectively, at least one of said terminals in a third one of said terminal sets including only a third one electrical connector section having a configuration similar to that of said other electrical connector sections of said terminals in said one terminal set and arranged so as to extend in the row formation therewith beyond both said one wall means and said another wall means of said casing, respectively;

a plurality of switch means supporting sections on preselected ones of said terminals in said one terminal set, said another terminal set and said third one terminal set and extending from said one wall means interiorly of said casing into said chamber means thereof, respectively; and another of said terminals in said another terminal set comprising a ground terminal including means extending therefrom exteriorly of said casing into overlaying relation at least adjacent a third one of said wall means generally adjacent said one wall means and opposite said another wall means of said casing and adapted for ground connection.

2. The switch and terminal assembly as set forth in claim 1 wherein at least one of said one terminal set, said another terminal set and said third one terminal set includes at least one dummy terminal.

3. The switch and terminal assembly as set forth in claim 1 further comprising a set of hangar brackets integrally formed with said third one wall means and extending therebeyond.

4. A switch and terminal assembly comprising:

a casing having a plurality of wall means defining switch accommodating chamber means within said casing;

a plurality of sets of terminals associated with said casing along one of said wall means thereof, said terminals in one of said terminal sets including a pair of dissimilar electrical connector sections arranged in angular relation and extending in row formation with each other exteriorly of said casing, respectively, one of said electrical connector sections of said terminals in said one terminal set extending in the row formation thereof only beyond said one wall means of said casing, and the other of said electrical connector sections of said terminals in said one terminal set extending in the row formation thereof beyond both said one wall means and another of said wall means of said casing adjacent said one wall means, respectively, said terminals in another of said terminal sets including only another one electrical connector section similar to said one electrical connector sections of said terminals in said one terminal set and arranged so as to extend in the row formation therewith only beyond said one wall means of said casing, respectively, and at least one terminal in a third one of said terminal sets including only a third one electrical connector section similar to said other electrical connector sections of said terminals in said one terminal set and arranged so as to extend in the row formation therewith beyond both said one and another wall means of said casing, respectively.

5. A switch and terminal assembly as set forth in claim 4 wherein one of said terminals in said another terminal set includes means extending therefrom exteriorly of said casing in overlaying relation at least adjacent a third one of said wall means of said casing and adapted for ground connection.

6. A switch and terminal assembly as set forth in claim 4 wherein one terminal in said one terminal set, two terminals in said another terminal set and two terminals in said third one terminal set further include a switch means supporting section disposed interiorly to said casing within said chamber means thereof, respectively.

7. A switch and terminal assembly as set forth in claim 4 wherein two terminals in said one terminal set, three terminals in said another terminal set and said at least one terminal in said third one terminal set further include a switch means supporting section disposed interiorly of said casing within said chamber means thereof, respectively.

8. A switch and terminal assembly as set forth in claim 4 further comprising a plurality of switch means supporting sections on preselected ones of said terminals in said terminal sets and extending from said one wall means interiorly of said casing into said chamber means thereof, respectively.

9. The switch and terminal assembly as set forth in claim 4 wherein at least one of said one terminal set, said another terminal set and said third one terminal set includes at least one dummy terminal.

10. The switch and terminal assembly as set forth in claim 4 further comprising a set of hanger brackets on said casing and extending beyond said third one wall means.

11. A switch and terminal assembly comprising:
a casing having a plurality of wall means defining switch accommodating chamber means within said casing;
a plurality of terminals associated with said casing along one of said wall means thereof, at least some of said terminals including a pair of electrical connector sections arranged generally in planar and angular relation and extending generally in row formation with each other exteriorly of said casing, one of said electrical connector sections of said at least some terminals extending in the row formation thereof only beyond said one wall means of said casing and the other of said electrical connector sections of said at least some terminals extending in the row formation thereof beyond both said one wall means and another of said wall means of said casing adjacent said one wall means, respectively.

12. A switch and terminal assembly as set forth in claim 11 wherein said one and other electrical connector sections of said at least some terminals have dissimilar configurations.

13. A switch and terminal assembly as set forth in claim 11 wherein at least another one of said terminals includes only one electrical connector section arranged so as to extend exteriorly of said casing in the row formation with one of said one and other electrical connector sections of said at least some terminals.

14. A switch and terminal assembly as set forth in claim 11 wherein only another one of said terminals includes only one electrical connector section arranged so as to extend exteriorly of said casing in the row formation with one of said one and other electrical connector sections of said at least some terminals, and means adapted for ground connection extending from said only another one terminal exteriorly of said casing so as to be disposed at least adjacent a third one of said wall means of said casing.

15. The switch and terminal assembly as set forth in claim 11 further comprising a set of hangar brackets integral with said casing and extending beyond a third one of said wall means adjacent said one wall means and opposite said another wall means.

16. The switch and terminal assembly as set forth in claim 15 wherein said hangar brackets include a set of flanges extending in a direction away from said third one wall means, a set of end portions on said flanges extending in a direction at least generally in planar relation with said third one wall means, and a set of deformable sections on said end portions extending in a direction generally toward said third one wall means, respectively.

17. The switch and terminal assembly as set forth in claim 13 wherein said at least another one terminal comprises a dummy terminal.

* * * * *